United States Patent
Li et al.

(10) Patent No.: US 11,157,574 B2
(45) Date of Patent: Oct. 26, 2021

(54) SYSTEMS AND METHODS FOR EVENT DETECTION AND CLUSTERING

(71) Applicant: Thomson Reuters Enterprise Centre GmbH, Zug (CH)

(72) Inventors: Quanzhi Li, Mountainside, NJ (US); Armineh Nourbakhsh, Brooklyn, NY (US); Sameena Shah, White Plains, NY (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 122 days.

(21) Appl. No.: 15/800,876

(22) Filed: Nov. 1, 2017

(65) Prior Publication Data
US 2018/0121555 A1    May 3, 2018

Related U.S. Application Data

(60) Provisional application No. 62/416,783, filed on Nov. 3, 2016.

(51) Int. Cl.
*G06F 16/00*     (2019.01)
*G06F 16/9535*   (2019.01)
(Continued)

(52) U.S. Cl.
CPC .......... *G06F 16/9535* (2019.01); *G06F 9/547* (2013.01); *G06F 16/287* (2019.01); *H04L 51/32* (2013.01)

(58) Field of Classification Search
CPC .... G06F 16/9535; G06F 16/287; G06F 9/547; H04L 51/32
(Continued)

(56) References Cited

U.S. PATENT DOCUMENTS

2010/0121843 A1    5/2010  Goeldi
2012/0042022 A1*   2/2012  Sheth .............. H04L 51/32
                                              709/206
(Continued)

FOREIGN PATENT DOCUMENTS

WO    2011009101 A1    1/2011
WO    2016057378 A1    4/2016

OTHER PUBLICATIONS

Bijoy Sarkar, "Embedding Temporal Information in Vector Representation of Paragraph", Department of Computer Sciences, University of Wisconsin-Madison, 6 pages, May 5, 2015.*
(Continued)

*Primary Examiner* — Monica M Pyo
(74) *Attorney, Agent, or Firm* — Norton Rose Fulbright US LLP

(57) ABSTRACT

A method of detecting events in and clustering social media postings for display on a user system may include retrieving, via an application programming interface (API) of a social media system over at least one first communication network, at least one posting of the social media system; determining whether the at least one posting has content referring to a predetermined time period; upon determining that the at least one posting has content referring to the predetermined time period, determining whether the at least one posting corresponds to an existing cluster of postings related to an event; upon determining that the at least one posting corresponds to the existing cluster of postings relating to the event, storing, in at least one database on a non-transistory machine-readable storage medium, the existing cluster of postings modified to include the at least one posting; and providing, via at least one second communication network, a representation of the modified existing cluster of postings for display on a user system.

23 Claims, 9 Drawing Sheets

(51) Int. Cl.
G06F 16/28 (2019.01)
G06F 9/54 (2006.01)
H04L 12/58 (2006.01)

(58) Field of Classification Search
USPC .......................................................... 707/739
See application file for complete search history.

(56) References Cited

U.S. PATENT DOCUMENTS

| | | | |
|---|---|---|---|
| 2012/0059901 A1 | 3/2012 | Tsai | |
| 2012/0079020 A1 | 3/2012 | Park et al. | |
| 2012/0102050 A1* | 4/2012 | Button | G06F 16/9535 707/749 |
| 2013/0232159 A1* | 9/2013 | Daya | G06Q 50/01 707/758 |
| 2013/0290208 A1 | 10/2013 | Bonmassar et al. | |
| 2014/0085328 A1 | 3/2014 | Codella et al. | |
| 2014/0129625 A1 | 5/2014 | Haugen et al. | |
| 2014/0157171 A1* | 6/2014 | Brust | G06F 3/0481 715/771 |
| 2014/0172837 A1* | 6/2014 | Sommer | G06Q 50/01 707/722 |
| 2014/0201227 A1 | 7/2014 | Hamilton-Dick et al. | |
| 2014/0337257 A1 | 11/2014 | Chatterjee et al. | |
| 2015/0081713 A1 | 3/2015 | Alonso et al. | |
| 2015/0120502 A1 | 4/2015 | Jung et al. | |
| 2015/0195406 A1* | 7/2015 | Dwyer | H04M 3/5175 379/265.07 |
| 2016/0019301 A1 | 1/2016 | Goldenstein et al. | |
| 2016/0026919 A1 | 1/2016 | Kaisser et al. | |
| 2016/0055164 A1 | 2/2016 | Cantarero et al. | |
| 2016/0203498 A1 | 7/2016 | Das et al. | |
| 2016/0328482 A1 | 11/2016 | Shah et al. | |

OTHER PUBLICATIONS

Volpetti et al., "Temporal Word Embeddings for Narrative Understanding", Conference '10, 2010, 5 pages.*
Yang et al., "Automatic Detection of Rumor on Sina Weibo", MDS'12 Aug. 12, 2012, Beijing,China, 7 pages.
Castillo et al., "Information Credibility on Twitter", WWW 2011, Mar. 28-Apr. 1, 2011, Hyderabad, India, ACM 978-1-4503-0632-4/11/03, pp. 675 to 684.
Gupta et al., "Faking Sandy: Characterizing and Identifying Fake Images on Twitter during Hurricane Sandy", WWW 2013 Companion, May 13-17, 2013, Rio de Janeiro, Brazil, ACM 978-1-4503-2038-2/13/05.
Boididou et al., "Challenges of Computational Verification in Social Multimedia", WWW14 Companion, Apr. 7-11, 2014, Seoul, Korea, ACM 978-1-4503-2745-9/14/04, http:I/dx.doi.org/10.1145/2567948. 2579323, pp. 743 to 748.
Finn et al., "Investigating Rumor Propagation with TwitterTrails", http://cs.wellesiey.edu/~pmetaxas!TwitterTmilsinvestigating-rumor-propagation.pdf, 10 pages.
Leskovec et al., "Meme-tracking and the Dynamics of the News Cycle", KDD '09 Paris, France, 9 pages.

Ratkiewicz et ai., "Detecting and Tracking Political Abuse in Social Media", Proceedings of the Fifth International AAAI Conference on Weblogs and Social Media, pp. 297 to 304.
Ennals et al., "Highlighting Disputed Claims on the Web", WWW 2010, Apr. 26-30, 2010, Raleigh, North Carolina, USA, ACM 978-1-60558-799-8/10/04, 10 pages.
Osborne et al., "Real-Time Detetion, Tracking, and Monitoring of Automatically Discovered Events in Social Media", Proceedings of 52nd Annual Meeting of the Association for Computational Linguistics: System Demonstrations, Baltimore, Maryland USA, Jun. 23-24, 2014, pp. 37-42.
Preotiuc-Pietro et al., "A temporal model of text periodicities using Gaussian Processes", Proceedings of the 2013 Conferece on Empirical Methods in Natural Language Processing, Seattle, Washington, USA, Oct. 18-21, 2013, pp. 977-988.
Friggeri et al., "Rumor Cascades", Proceedings of the Eighth International AAAI Conference on Weblogs and Social Media, pp. 101-110.
Mendoza et al., "Twitter Under Crisis: Can we trust what we RT?", 1st Workshop on Social Media Analytics (SOMA '10), Jul. 25, 2010, Washington, DC, USA, 9 pages.
Petrovic et al., "Streaming First Story Detection with application to Twitter", http://homepages.inf.ed.ac.uk/miles/papers/naacl10a.pdf, 9 pages.
Qazvinian et al., "Rumor has it: Identifying Misinformation in Microblogs", Proceedings of the 2011 Conference on Empirical Methods in Natural language Processing, Edinburgh, Scotland, UK, Jul. 27-31, 2011, pp. 1589-1599.
Wu et al., "False Rumors Detection on Sina Weibo by Propagation Structures", http://www.cs.sjtu.edu.cn/-kzhu/papers/kzhu-rumor.pdf, 12 pages.
Sun et al., "Detecting Event Rumors on Sina Weibo Automatically", APWeb 2013, LNCS 7808, 2013, pp. 120-131.
Li et al,, "Real-Time Novel Event Detection from Social Media", IEEE International Conference on Data Engineering (ICDE 2017), 11 pages.
Collobert et al., "Natural Language Processing (Almost) from Scratch", Journal of Machine Learning Research 12, 2011, pp. 2493-2537.
McMinn et al., "Building a Large-scale Corpus for Evaluating Event Detection on Twitter", CIKM'13, Oct. 27-Nov. 1, 2013, San Francisco, CA, USA, 10 pages.
Petrovic et al., "Using paraphrases for improving first story detection in news and Twitter", Proceedings of the 2012 Conference of the North American Chapter of the Association for Computational Linguistics: Human Language Technologies, Montreal, Canada, 2012, pp. 338-346.
Owoputi et al., "Improved Part-of-Speech Tagging for Online Conversational Text with Word Clusters", Proceedings of NAACL, 2013, 9 pages.
Allan, et al. "First Story Detection in TDT Is Hard", Proceedings of the ninth international conference on Information and knowledge management, Virginia, USA, 2000, pp. 374-381.
International Search Report and Written Opinion dated Jan. 4, 2018, of the corresponding International Application PCT/US2017/059533, filed Nov. 1, 2017, 9 pages.

* cited by examiner

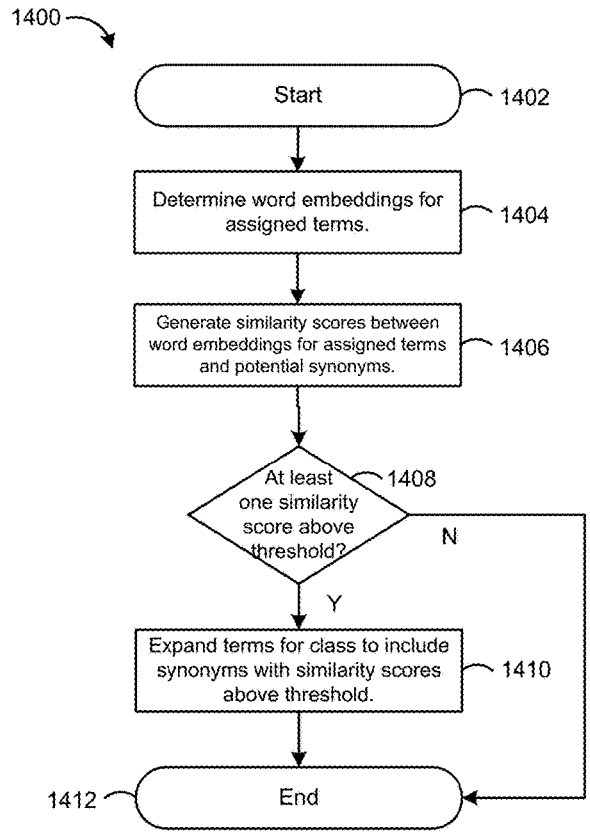
FIG. 14
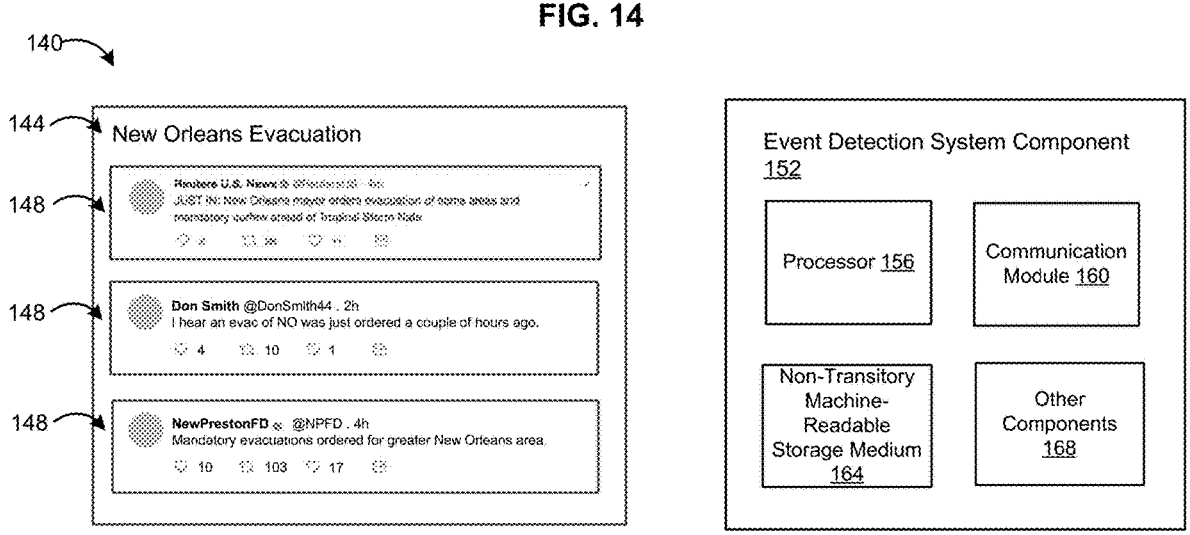
FIG. 15
FIG. 16

SYSTEMS AND METHODS FOR EVENT DETECTION AND CLUSTERING

CROSS REFERENCE TO RELATED APPLICATIONS

This application claims priority to U.S. Provisional Patent Application No. 62/416,783, filed on Nov. 3, 2016, which is hereby incorporated by reference herein in its entirety. This application is also related to U.S. Non-Provisional patent application Ser. No. 15/143,730, filed on May 2, 2016, which is also hereby incorporated by reference herein in its entirety.

BACKGROUND INFORMATION

Social media systems, such as Twitter, contain postings including a large and diverse amount of information, ranging from daily-life stories to the latest worldwide and local events and news. Postings of these systems, such as Tweets, thus are a dynamic source of information enabling individuals and organizations to stay informed of what is happening now, have emerged as a fast communication channel for gathering and spreading breaking news, and also are an important tool for some specific tasks, such as terrorist activities monitoring, crime prediction, and election result prediction.

However, difficulties have emerged with extracting useful information from social media streams. Events can be generally defined as real-world occurrences that unfold over space and time. Social media users may talk about any event in social media; some events may be as old as days, months, or even years ago. Difficulties thus may exist in distinguishing between social media postings related to new or recent events, such as events that are currently happening or just happened a short time ago, and social media postings that are related to old events.

A number of social media postings also may relate to the same event, and grouping such postings may better help users understand the event and its development. However, since social media postings include large amounts of irregular and abbreviated words, spelling and grammatical errors, event detection from social media streams pose new challenges that are different from those faced by event detection in traditional media.

Thus, a need exists for systems and methods to detect social media postings related to events occurring in specific time periods, such as new or recent events. A need also exists for systems and methods to group together postings that relate to the same event.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

FIG. 14 a flowchart depicting an embodiment of a method of expanding a set of terms assigned to a semantic class to include synonyms.

FIG. 15 depicts an embodiment of a view of a cluster of postings provided to a user system.

FIG. 16 is a schematic diagram depicting an embodiment of a computer system that may be used to implement components of the event detection system.

DETAILED DESCRIPTION OF EXAMPLE EMBODIMENTS

A method of detecting events in, and clustering, social media postings for display on a user system may include retrieving, via an application programming interface (API) of a social media system over at least one first communication network, at least one posting of the social media system; determining whether the at least one posting has content referring to a predetermined time period; upon determining that the posting has content referring to the predetermined time period, determining whether the posting corresponds to an existing cluster of postings related to an event; upon determining that the posting corresponds to the existing cluster of postings relating to the event, storing, in at least one database on a non-transitory machine-readable storage medium, the existing cluster of postings modified to include the at least one posting; and providing, via at least one second communication network, a representation of the modified existing cluster of postings for display on at least one user system.

Figure 1:
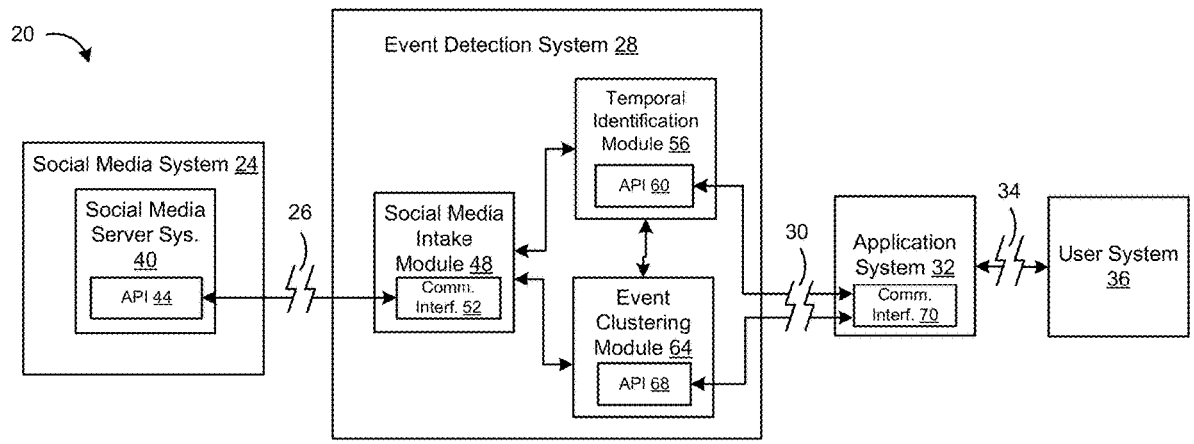
FIG. 1 is a schematic diagram depicting an embodiment of a system for providing improved identification, clustering and presentation of social media postings related to events of a predetermined time period.

FIG. 1 depicts an embodiment of a system 20 for providing improved identification, clustering and presentation of social media postings related to events of a predetermined time period. The system includes a social media system 24, an event detection system 28, an application system 32, and a user system 36.

The social media system 24 provides a platform for its users to post messages and/or content to a network of other users using accounts of the system 24. The social media system 24 includes a social media server 40 having a communication interface 44 such as an application program interface (API). The social media server 40 provides functionality of the social media system 24 for users as discussed herein, with the communication interface 44 providing communications over one or more communication networks 26 between the social media system 24 and other systems. The social media system 24 can take various different forms. The social media system 24 can be Twitter, in which users use their accounts to, among other things, post short messages and/or content, called Tweets, on the system. In other embodiments, the social media system 24 can be another system, such as one or more of Facebook, Instagram, Snapchat, Tumblr, Pinterest, Flickr, or Reddit, etc.

The event detection system 28 provides identification, clustering and presentation of social media postings related to a predetermined time period. The event detection system 28 includes a social media intake module 48, a temporal identification module 56, and an event clustering module 64. The social media intake module 48 retrieves social media postings, and optionally account information, of the social media system 24 for processing by the temporal identification module 56 and event clustering module 64, and includes a communication interface 52 to retrieve the postings from the communication interface 44 of the social media system 24 over one or more communication networks 26. The temporal identification module 56 identifies temporal information in retrieved social media postings to determine if the social media postings are referring to an event of a predetermined time period, such as a current or recent event or an old event. The event clustering module 64 clusters social media postings that refer to the same event of the predetermined time period into existing or new clusters of postings. The temporal identification and event clustering modules 56, 64 each include a communication interface 60, 68, such as an API, to output temporal identifications and event clusters, respectively, to a downstream application 32 or user system 36 via one or more communication networks 30, 34.

The application system 32 may be any system that provides an application, such as, e.g., serves a user interface of an application, to the user system 36, the application utilizing the temporal identifications and/or event clusters generated by the temporal identification module 56 and event clustering module 64 of the event detection system 28. For example, the application may be an event, news, opinion, etc. presentation application that utilizes the temporal identifications and/or event clusters to present events, news, opinions, etc. of social media postings to users. Alternatively, the event detection system 28 may output directly to the user system 36.

The user system 36 may be any computing platform, such as one more or more a computer, a desktop computer, a laptop computer, a tablet, a smart phone, or other stationary or mobile devices, etc., that a user uses to communicate with the application system 32 or event detection system 28 via one or more communication networks 30, 34.

In embodiments, a system for providing improved identification, clustering and presentation of social media postings related to events of a predetermined time period may include only any subset of, or an alternative connection of, the features depicted in or discussed herein in regard to FIG. 1.

Figure 2:
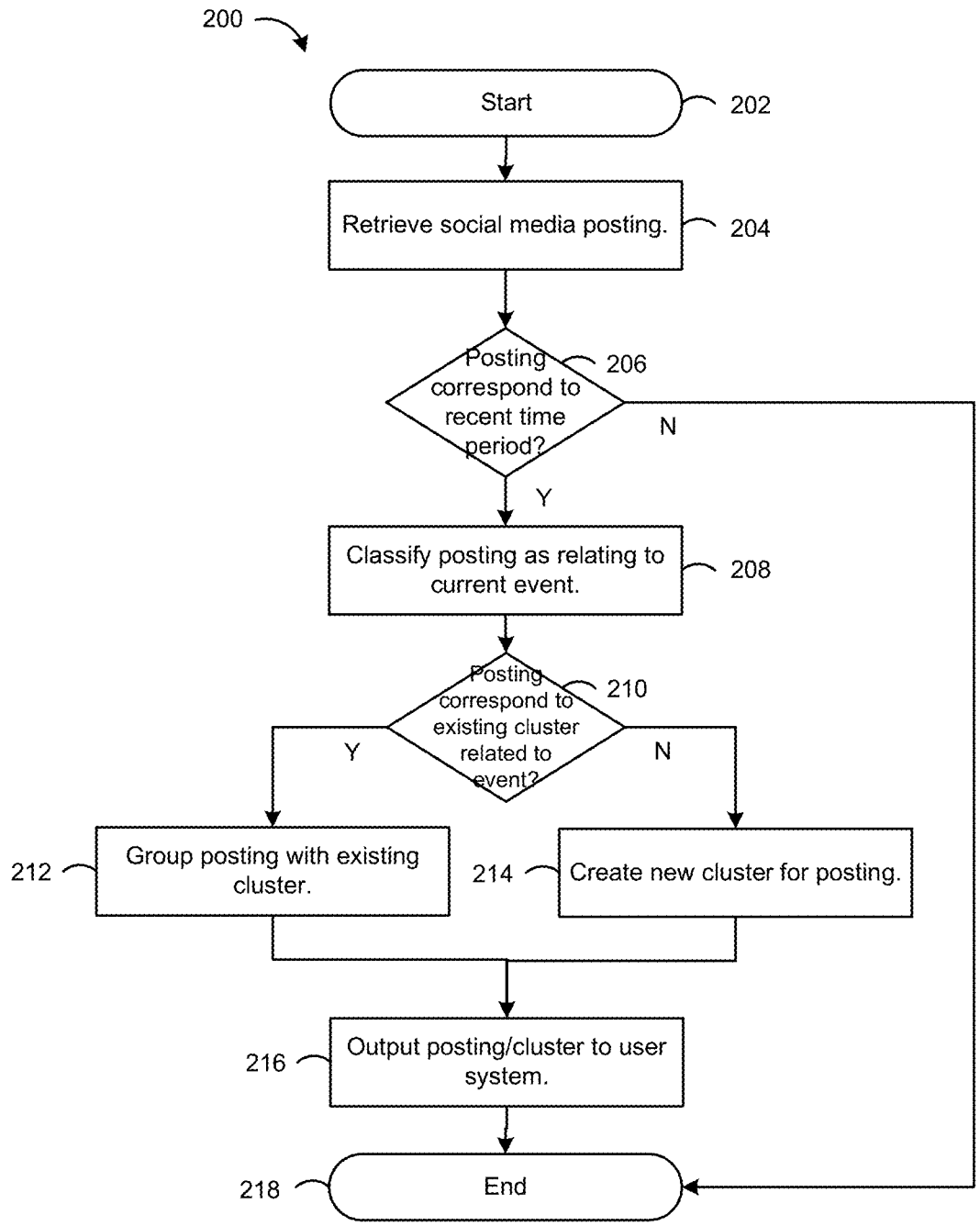
FIG. 2 is a flowchart depicting an embodiment of a method of providing identification, clustering and presentation of social media postings related to events of a predetermined time period.

FIG. 2 depicts an embodiment of a method 200 of providing improved identification, clustering and presentation of social media postings related to events of a predetermined time period. The method may be performed by or involving components of the system 20 of FIG. 1, such as by the event detection system. The method begins at step 202.

At step 204, one or more social media postings are retrieved from the social media system 28 by the social media intake module 48. At step 206, it is determined whether a retrieved posting references a predetermined time period, such as a predetermined recent time period, by the temporal identification module 56. If it is determined at step 206 that the posting does not refer to the predetermined time period, the posting is not relevant to the inquiry of the event detection system 28, and the method proceeds to step 218, where the method ends. If, however, it is determined at step 206 that the posting does refer to the predetermined time period, the method proceeds to step 208, where the posting is classified as relating to the predetermined time period by the temporal identification module 56, such as by recording the classification in a temporal identification database.

At step 210, for postings referring to the predetermined time period, it is determined whether the posting refers to the same event referenced by an existing cluster of postings by the event clustering module 64. If at step 210, it is determined that the posting does refer to the same event referenced by an existing cluster of postings, the existing cluster of postings is modified to include the posting, such as by adding the posting to the cluster in a cluster database. If, however, at step 210, it is determined that the posting does not refer to the same event referenced by any existing cluster of postings, a new cluster is created and the posting is added to the new cluster, such as by creating the cluster and adding the posting to the cluster in the cluster database.

At step 216, clusters of postings referring to events in the predetermined time period (and/or cluster identification data for the clusters of postings) and/or postings referring to an event in the predetermined recent time period (and/or temporal identification data for postings as referring to an event in the predetermined recent time period) are output for display on the user system 36, such as via the application system 32. For example, an API of the event detection system, such as an API 60 of the temporal identification module 56 and/or an API 68 of the event clustering module 64, may provide the output to a communication module 70 of the application over the one or more communication networks 30, which may then provide the output to the user system 36 over the one or more communication networks 34. Providing the output to the application may enable the downstream functionality of the application related to clustering and temporal identification of postings.

In embodiments, a method of providing improved identification, clustering and presentation of social media postings related to events of a predetermined time period may include only any subset of, or an alternative ordering of, the features depicted in or discussed above in regard to FIG. 2.

Figure 3:
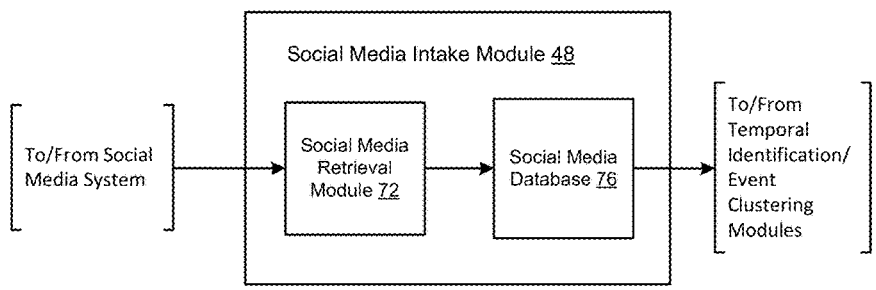
FIG. 3 is a schematic diagram depicting an embodiment of a social media intake module of an event detection system.

FIG. 3 depicts an embodiment of the social media intake module 48, including a social media retrieval module 72 and a social media database 76. The social media retrieval module 72 retrieves social media postings from the social media system 24, using the communication interface 52 communicating with the communication interface 44 of the social media system 24 over the one or more communication networks 26. The communication interface 52 of the social media retrieval module 48, shown in FIG. 1, is omitted from FIG. 3 for illustration purposes, but may be included in the social media retrieval module 72 or as a separate component. In embodiment, the social media retrieval module 72 also may retrieve account information of social media accounts of the social media system 24. The social media database 76 stores, on a non-transitory machine-readable storage medium, the retrieved social media postings and account information.

In embodiments, a social media intake module may include only any subset of, or an alternative connection of, the features depicted in or discussed herein in regard to FIG. 3.

Figure 4:
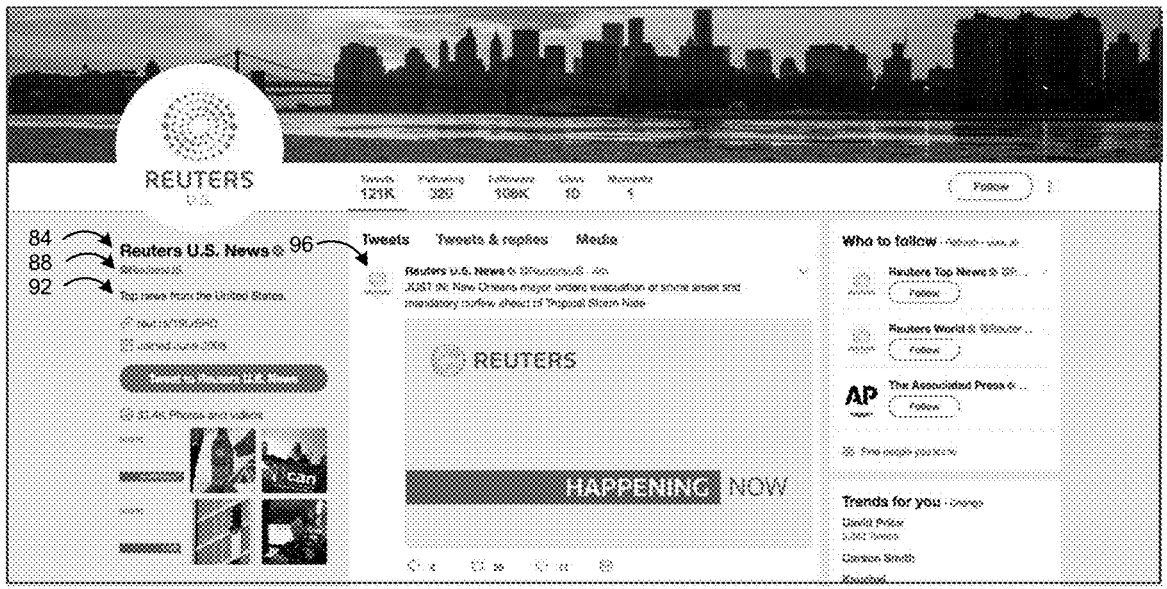
FIG. 4 depicts an embodiment of a view of an account of a social media system provided to a user system.

FIG. 4 depicts an embodiment of a view 80 of an account of a social media system provided to a user system. The view 80 includes account information, including an account name 84, an account address 88, an account bio 92, etc., and recent postings 96 of the account, etc.

Figure 5:
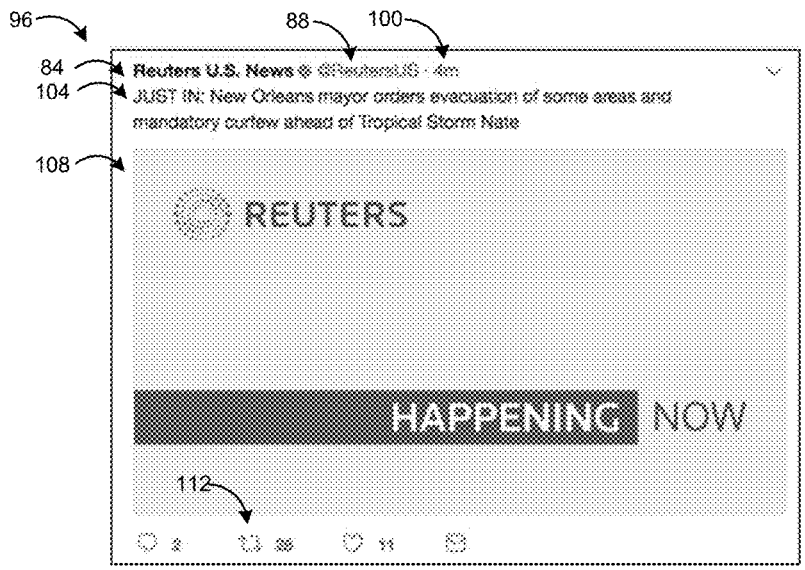
FIG. 5 depicts an embodiment of a view of a posting of an account of a social media system provided to a user system.

FIG. 5 depicts an embodiment of the view of the recent posting 96 of the account depicted in FIG. 4 in greater detail. The view includes posting information, including an account name 84 of the account originating the posting 96, an account address 88 of the account originating the posting 96, a time 100 of the posting 96 (e.g., expressed as a time deference between a time of the posting and a present time of the view), a text 104 of the posting 96, other content such as an image 108 of the posting 96, a number of repostings 112 of the posting 96, etc.

Figure 6:
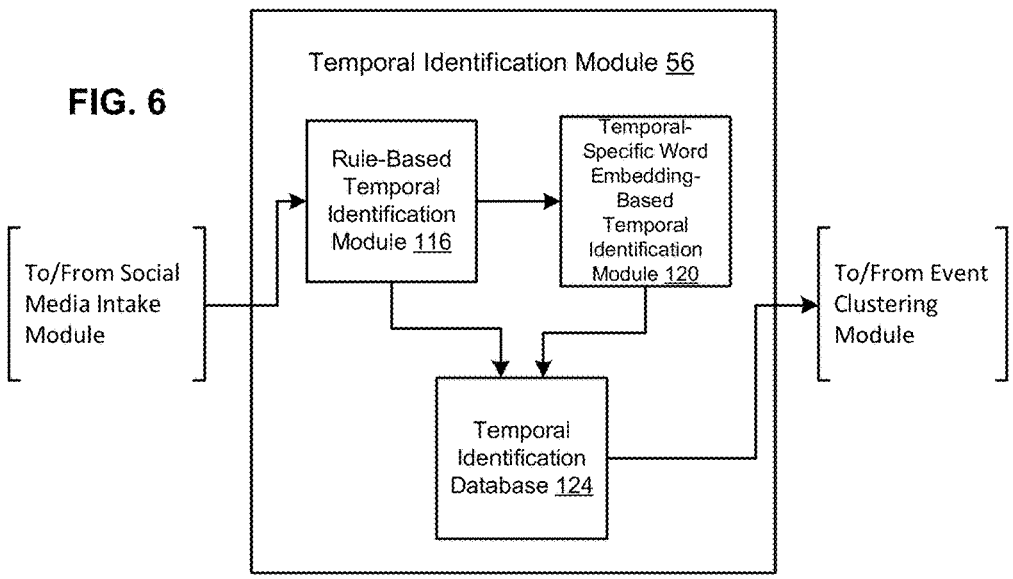
FIG. 6 is a schematic diagram depicting an embodiment of a temporal identification module of the event detection system.

FIG. 6 depicts an embodiment of the temporal identification module 56, including a rule-based temporal identification module 116, a temporal-specific word embedding (TSWE)-based temporal identification module 120, and a temporal identification database 124. The rule-based temporal identification module 116 processes the text of a social media posting according to a set of rules to attempt to make a determination as to whether the posting refers to an event in the predetermined time period. The TSWE-based temporal identification module 120 processes a social media posting by generating temporal-specific word embeddings for the posting, and classifying the posting based on the generated embeddings to make a determination as to whether the posting refers to an event in the predetermined time period. The API 60 of the temporal identification module 56, shown in FIG. 1, is omitted from FIG. 6 for illustration purposes, but may be included in the one or both of the rule-based temporal identification module 116 and TSWE-based temporal identification module 120, or as a separate component. The temporal identification database 124 stores determinations by the temporal identification modules 116, 120 as to whether the posting refers to an event in the predetermined time period in association with the posting.

In embodiments, a temporal identification module may include only any subset of, or an alternative connection of, the features depicted in or discussed herein in regard to FIG. 6.

Figure 7:
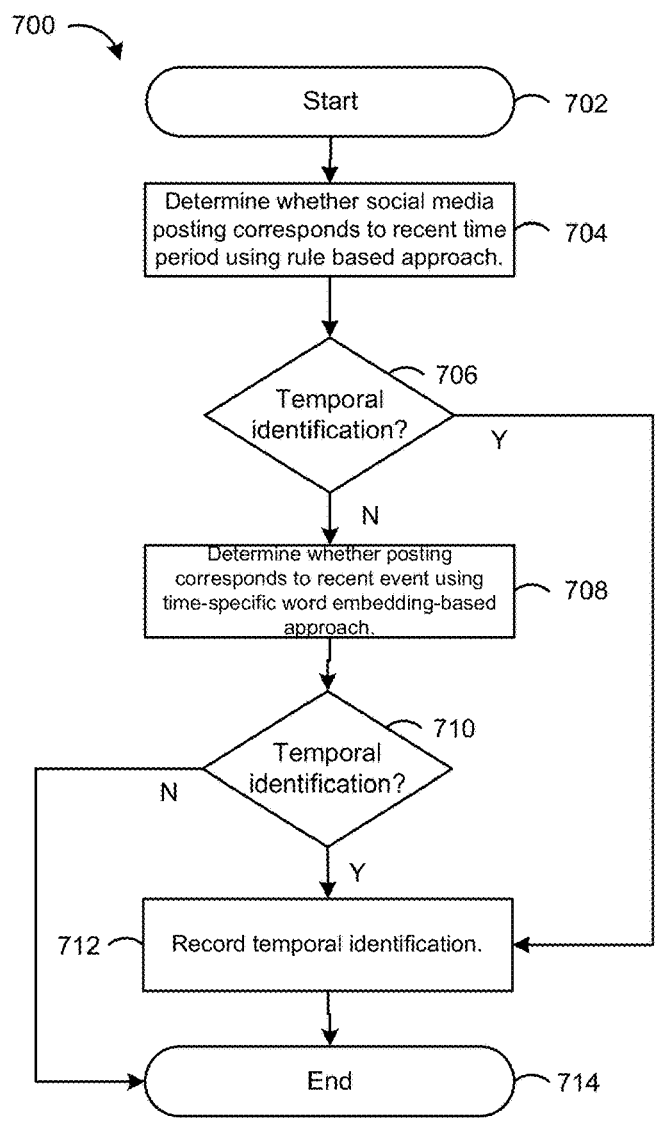
FIG. 7 is a flowchart depicting an embodiment of a method of determining whether a social media posting refers to an event in a predetermined time period.

FIG. 7 depicts an embodiment of a method 700 of determining whether a social media posting refers to an event in a predetermined time period. Embodiments of the method 700 may be used to perform the temporal identification and classification of steps 206 and 208 of the method 200. The method may be performed by or involving components of the temporal identification module 56 of FIG. 6. The method begins at step 702.

At step 704, the social media posting is processed to determine whether or not it refers to an event in the predetermined time period, such as a predetermined recent time period, using the rules based approach by the rules-based temporal identification module 116. At step 706, if the rules-based approach results in a temporal identification, i.e., a result either that the posting refers to an event in the predetermined time period or that the posting does not refer to an event in the predetermined time period, then the method proceeds to step 712. At step 712, a classification of the posting as referring to an event in the predetermined time period or not referring to an event in the predetermined time period is recorded in the temporal identification database 124. The method then proceeds to step 714, where the method ends.

If at step 706 the rules-based approach does not result in a temporal identification, the method proceeds to step 708, where the posting is processed to determine whether or not it refers to an event in the predetermined time period, such as a predetermined recent time period, using the TSWE-based approach by the TSWE-based temporal identification module 120. At step 710, if the TSWE-based approach results in a temporal identification, then the method proceeds to step 712, where, as discussed above, a classification of the posting as referring to an event in the predetermined time period or not referring to an event in the predetermined time period is recorded in the temporal identification database 124. If at step 710, the TSWE-based approach also does not result in a temporal identification, the method proceeds to step 708, where the method ends, with no temporal identification made.

In the depicted embodiment of the method 700, the rule-based temporal identification module 116 and TSWE-based temporal identification module 120 perform sequential determinations. This may provide a benefit of utilizing the rules-based approach, which may involve a relatively lower computational load, to attempt to make a temporal identification first, followed by the TSWE-based approach, which may involve a relatively higher computational load, to attempt to make a temporal identification only on those postings for which the rules-based approach did not result in a determination, thus overall conserving computational power. In other embodiments, the rule-based temporal identification module 116 and TSWE-based temporal identification module 120 can instead be used to perform other sequential determinations or parallel determinations, or only one or other be used to make a single determination.

Recording the temporal identification in the temporal identification database 124 of step 712 may include storing in the temporal identification database 124 an indication that the posting refers to an event at the predetermined time period, and, in association with the indication, a representation of the posting or a subset of the elements of the posting (such as one or more of the name of the account originating the posting, the address of the account originating the posting, the heading of the posting, the time of the posting, etc.). Recording the temporal identification of postings may enable time-based event detection, clustering and other functions in the event detection system 28 and/or application.

In embodiments, a method of determining whether a social media posting refers to an event in a predetermined time period may include only any subset of, or an alternative ordering of, the features depicted in or discussed above in regard to FIG. 7.

For the temporal identifications discussed herein, such as performed by the rule-based approach or the TSWE-based approach, the predetermined time period may be selectively configured. In one embodiment, the predetermined recent time period may be a predetermined recent time period covering a span of time from a predetermined amount of time prior to the present time to the present time, i.e., a span of time having a length of the predetermined amount of time and positioned immediately prior to the present time. Events older than the predetermined recent time period may be called old and events during the predetermined recent time period may be called new or recent. The predetermined amount of time may be selected according to, e.g., a particular application. An old event may have different configuration in different use cases or applications. For example, an event older than 12 hours from the present time may be considered as an old event in one application, but may be regarded as still a relatively new event in another application. It may depend on the purposes of the application and user requirements. The time threshold, i.e., the predetermined amount of time prior to the present time, can be changed, such as by adjusting the rules in the rule based module and the training data used for building TSWE and the TSWE based temporal classifier. For example, in one embodiment, 12 hours is used as the time threshold—events older than about 12 hours are considered as old events and events newer than about 12 hours are consider new or recent events.

Alternatively, the temporal identifications discussed herein may make determinations regarding predetermined time period other than a predetermined recent time period. For example, the predetermined time period may be defined as extending between a first predetermined time, such as a first predetermined prior time, and a second predetermined time, such as a second predetermined prior time.

Figure 8:
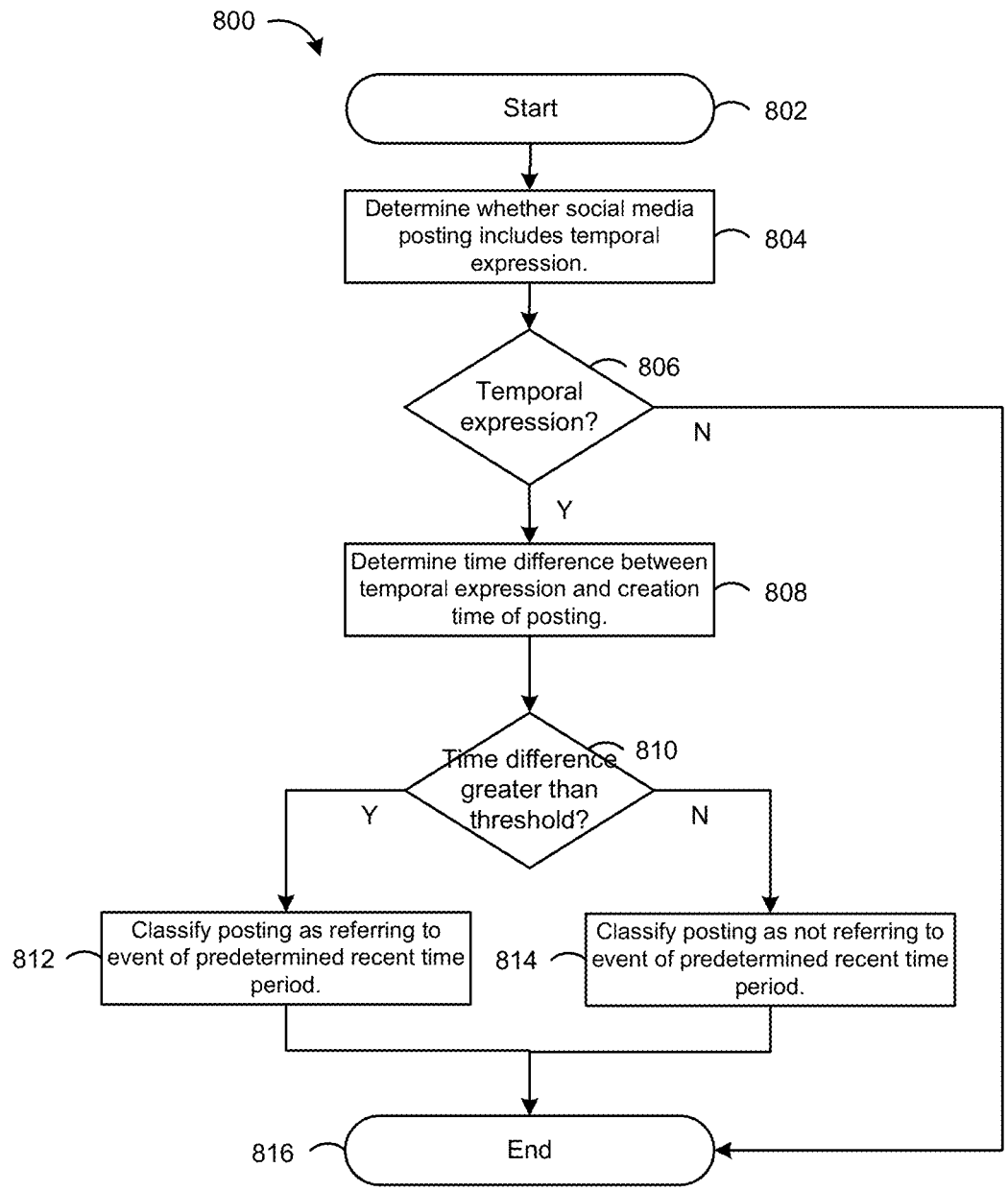
FIG. 8 is a flowchart depicting an embodiment of a method performing a temporal identification for a social media posting using a rules-based approach.

The rules-based approach processes the text of the social media posting using a set of rules to attempt to make a temporal identification of the posting. FIG. 8 depicts an embodiment of a method performing a temporal identification for a social media posting using a rules-based approach. Embodiments of the method 800 may be used to perform the rules-based temporal identification of step 704 of the method 700. The method may be performed by or involving components of the temporal identification module 56 of FIG. 6, such as the rules-based temporal identification module 116. The method begins at step 802.

At step 804, a detection for a temporal expression is performed on the social media posting. A temporal expression may be a text segment that expresses temporal information, such as "yesterday," "last week," "in 1945," "in World War II," "right now," "10 minutes ago," etc. To perform the detection, a set of regular expressions, where a regular expression may be a sequence of characters defining a text search pattern, may used to detect for different types of temporal expressions. For example, the following are some examples of common temporal expression type examples that may be detected using regular expressions:

"At 8 am," "around 6:30 pm";
"This morning," "yesterday," "tomorrow," "last year";
"Two days ago," "10 minutes ago";
"On Jan. 10," "in Feb.";
"This coming Monday," "last Friday";
"In 1996," "in the 60s," "before WWII"; and
"Recently," "just happened," "right now."

At step 806, if no temporal expression is identified in step 804, the method proceeds to step 816, where the method ends, with no temporal identification being achieved. If, however, at step 806, a temporal expression is identified, the method proceed to step 808, where a time difference between the posting's creation time, which is very close to the current time in a real-time system, and a time referenced by the temporal expression is determined. The time difference may be determined in various different ways. In one example, the time difference may be determined by identifying a specific time referenced by the temporal expression, and calculating a difference between that time and the posting creation time. In another example, a correspondence between specific temporal expressions and specific time differences may be maintained, and the corresponding time difference determined when one of the specific temporal expressions is used. The time difference may be expressed with varying precision, such as 1 hour, 4 hours, 2 days, 3 weeks, 5 years, 2 decades, etc.

At step 810, it is determined whether the time difference is greater than the predetermined time threshold, e.g., 12 hours, i.e., whether the posting is considered as referencing an event before the predetermined time period or within the predetermined time period. If at step 810, it is determined that the time difference is greater than the threshold, then the method proceeds to step 814, where the posting is classified as not referencing an event in the predetermined time period. If, however, at step 814, the time difference is less than the threshold, the method proceeds to step 812, where the posting is classified as referencing an event in the predetermined time period.

In embodiments, a method of performing a temporal identification of a social media posting using a rules-based approach may include only any subset of, or an alternative ordering of, the features depicted in or discussed above in regard to FIG. 8.

Figure 9:
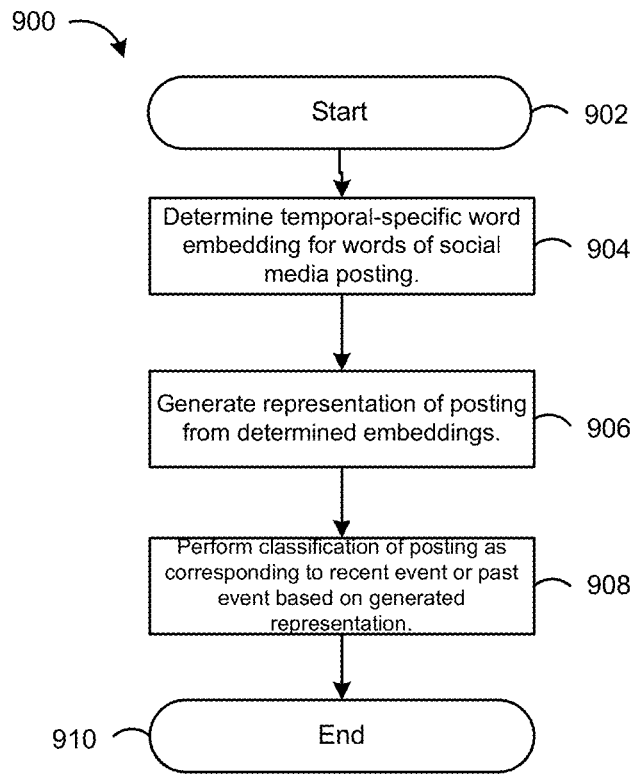
FIG. 9 is a flow chart depicting an embodiment of a method performing a temporal identification of a social media posting using a temporal-specific word embedding (TSWE)-based approach.

The TSWE-based approach generates temporal-specific word embeddings from the social media posting, and classifies the posting, as referencing an event in the predetermined time period or not, based on the generated embeddings. FIG. 9 depicts an embodiment of a method performing a temporal identification of a social media posting using a TSWE-based approach. Embodiments of the method 900 may be used to perform the TSWE-based temporal identification of step 708 of the method 700. The method may be performed by or involving components of the temporal identification module 56 of FIG. 6, such as the TSWE-based temporal identification module 120. The method begins at step 902.

At step 904, temporal-specific word embeddings are determined for words of the social media posting. In general, a word embedding is a numerical vector representing a meaning of a word of a lexicon in a vector space, where the vector space typically has a dimension much smaller than one dimension per word of the lexicon. Word embeddings may be generated using various different techniques, such as using a neural network to generate the word embeddings, where the neural network is trained with uses of words in contexts, such as, e.g., phrases and sentences. One technique to generate general word embeddings is the C&W technique, described in "Natural Language Processing (Almost) from Scratch," Ronan Collobert et al., Journal of Machine Learning Research, 2011, which is hereby incorporated by reference herein in its entirety. General word embeddings typically represent the entire possible meaning of a word without any emphasis on any particular aspect. By contrast, in step 904, rather than a general word embedding, temporal-specific word embeddings are determined for words of the posting, where the temporal-specific word embeddings specifically model the temporal meaning of the words. Using general word embeddings directly in temporal identification is not typically effective, since they mainly model a word's semantic context, ignoring the temporal clues in text. This typically leads to words with opposite polarity, such as tomorrow and yesterday, being mapped onto embedding vectors that are close to each other in some dimensions. By contrast, the temporal-specific word embedding modifies general word embedding, such as the C&W technique, to additionally encode temporal information in the word embeddings.

For example, the C&W technique learns word embeddings based on the syntactic contexts of words. It replaces the center word with a random word and derives a corrupted n-gram. The training objective is that the original n-gram is expected to obtain a higher language model score than the corrupted n-gram. The original and corrupted n-grams are treated as inputs of a feedforward neural network, respectively. Generation of the temporal-specific word embeddings of step 904 modifies the C&W technique by incorporating the temporal information into the neural network to learn the embeddings; it captures the temporal information of text as well as the syntactic contexts of words. Given an original (or corrupted) n-gram and the temporal polarity of a text as input, it predicts a two-dimensional vector ($f_0$, $f_1$), for each input n-gram, where ($f_0$, $f_1$) are the language model score and temporal score of the input n-gram, respectively. The training objectives are twofold: the original n-gram should get a higher language model score than the corrupted n-gram, and the polarity score of the original n-gram should be more aligned to the polarity label of the text than the corrupted one. The loss function is the linear combination of two losses—$loss_0(t, t')$ is the syntactic loss and $loss_1(t, t')$ is the temporal loss:

$$loss(t,t')=\alpha * loss_0(t,t')+(1-\alpha)*loss_1(t,t').$$

At step 906, a representation of the social media posting is determined from the determined temporal-specific word embeddings for the words of the posting. As different social media postings may include text of varying size, while classifiers, such as used in the step 908 as discussed below, typically prefer inputs of fixed size, a representation of the social media posting having a fixed size may be determined from the determined word embeddings, of which there may be a varying number due to the potentially varying number of words in the posting. The representation may include at least one of: a minimum vector calculated from the word embeddings (i.e., a vector containing for each dimension a minimum of the values of all of the determined word embeddings for that dimension), a maximum vector calculated from the word embeddings (i.e., a vector containing for each dimension a maximum of the values of all of the determined word embeddings for that dimension), an average vector calculated from the word embeddings (i.e., a vector containing for each dimension an average of the values of all of the determined word embeddings for that dimension), or a concatenation of one or more of the minimum, maximum or average vectors. In one specific embodiment, the representation is a concatenation of the minimum, maximum and average vectors. In such an embodiment, a social media posting may thus be represented as:

$$Z(t)=[Zmax(t),Zmin(t),Zave(t)],$$

where Z(t) is the representation of social media posting t, Zmax(t) is the maximum vector for the word embeddings of the posting, Zmin(t) is the minimum vector for the word embeddings of the posting, and Zave(t) is the average vector for the word embeddings of the posting.

At step 908, a classification of the posting as referencing an event in the predetermined time period or not referencing an event in the predetermined time period is performed. The classification may be performed using a classification algorithm such as a supervised machine learning algorithm trained using a social media posting set. A variety of different supervised machine learning algorithms may be used, such as support vector machines, logistic regression, Frank-Wolfe vector machine, adaptive boosting, decision trees, random forests, Bayesian networks, neural networks, or extensions thereof.

The TSWE-based approach enables improved temporal identification of postings relative to other manners of temporal identification, such as discussed below in comparison to other systems, and thus enables improved clustering of postings based on time-related features of the postings, and presentation of postings and clusters of postings based on time-related features, with a corresponding improved efficiency of consumption of social media by a user through presenting and clustering desired information separate from the unmanageable large size of the total social media output of the social media system, which is not possible otherwise.

In embodiments, a method of performing a temporal identification of a social media posting using a TSWE-based approach may include only any subset of, or an alternative ordering of, the features depicted in or discussed above in regard to FIG. 9.

Figure 10:
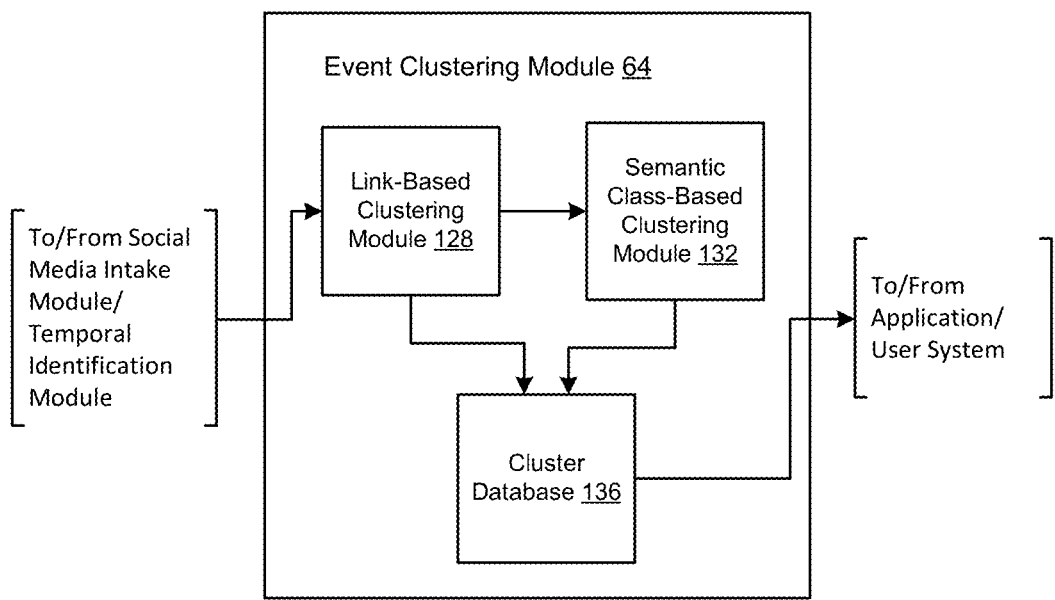
FIG. 10 is a schematic diagram depicting an embodiment of an event clustering module of the event detection system.

FIG. 10 depicts an embodiment of the event clustering module 64, including a link-based clustering module 128, a semantic class-based clustering module 132, and a cluster database 136. The link-based clustering module 128 processes the social media posting to determine whether the social media posting refers to a same event referenced by an existing cluster of postings based on links contained in the social media posting and existing cluster of postings. The semantic class-based temporal identification module 132 processes the social media posting to determine whether the social media posting refers to a same event referenced by an existing cluster of postings based on a comparison of semantic classes of words in the social media postings and existing cluster of postings. The API 68 of the clustering module 64, shown in FIG. 1, is omitted from FIG. 10 for illustration purposes, but may be included in the one or both of the link-based clustering module 128 or semantic class-based clustering module 132, or as a separate component. The cluster database 136 stores associations between postings and clusters of postings determined by the link-based clustering module 128 and semantic class-based clustering module 132.

In embodiments, an event clustering module may include only any subset of, or an alternative connection of, the features depicted in or discussed herein in regard to FIG. 10.

Figure 11:
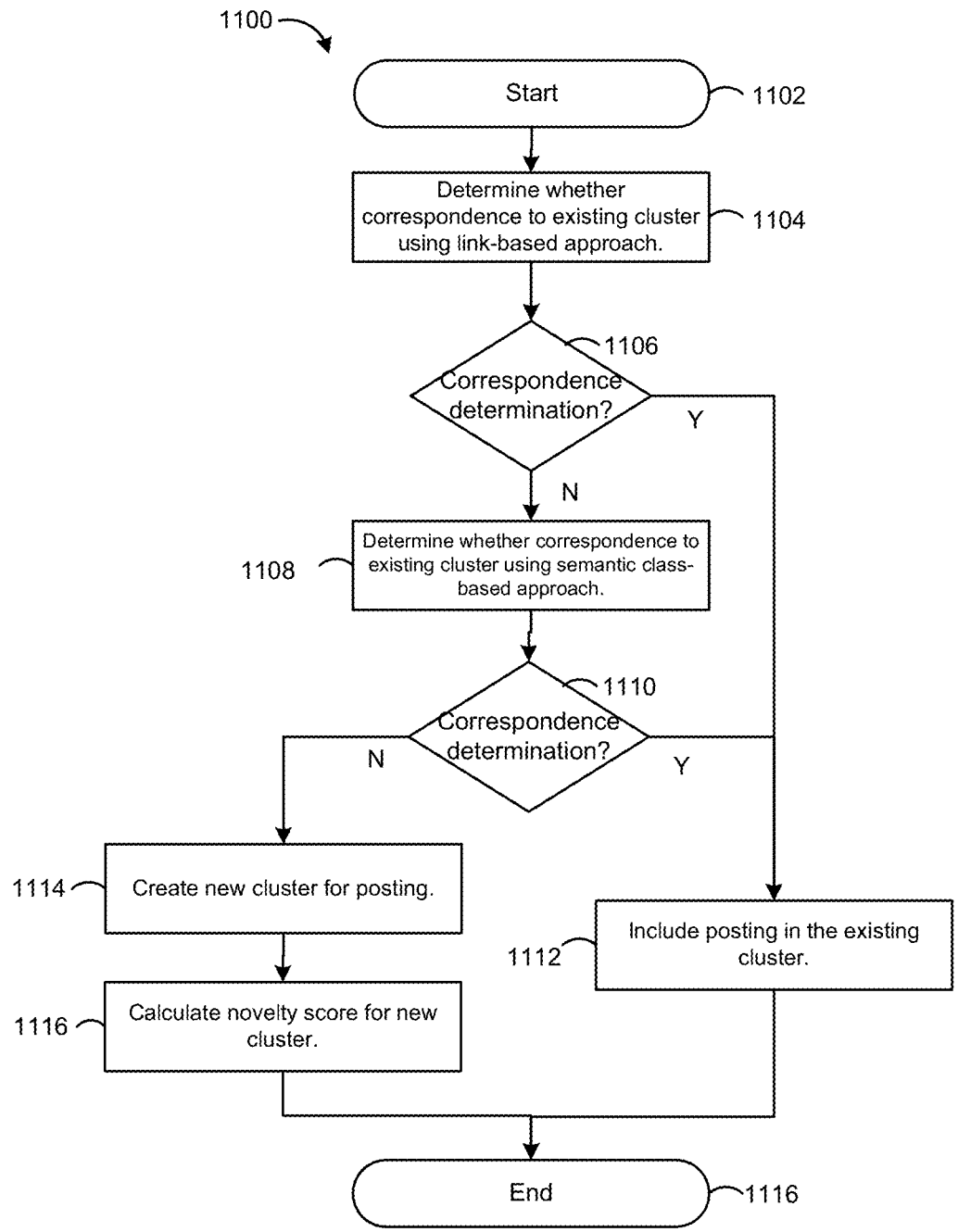
FIG. 11 is a flowchart depicting an embodiment of a method of determining whether a social media posting refers to a same event referenced by an existing cluster of postings.

FIG. 11 depicts an embodiment of a method 1100 of determining whether a social media posting refers to a same event referenced by an existing cluster of postings. Embodiments of the method 1100 may be used to perform the cluster correspondence identification, and grouping with existing or new clusters, of steps 210, 212 and 214 of the method 200. The method 1100 may be performed by or involving components of the event clustering module 64 of FIG. 10. The method begins at step 1102.

At step 1104, the social media posting is processed to determine whether or not it refers to a same event referenced by an existing cluster of postings using a link-based approach by the link-based clustering module 128. At step 1106, if the link-based approach results in a cluster correspondence determination, i.e., that the posting refers to a same event that is referenced by an existing cluster of postings, then the method proceeds to step 1112. At step 1112, the existing cluster of postings is modified to include the social media posting in the cluster database 136. The method then proceeds to step 1118, where the method ends.

If at step 1106, the link-based approach does not result in a cluster correspondence determination, the method proceeds to step 1108, where the posting is processed to determine whether or not it refers to a same event referenced by an existing cluster of postings using a semantic class-based approach by the semantic class-based clustering module 132. At step 1110, if the semantic class-based approach results in a cluster correspondence determination, then the method proceeds to step 1112, where, as discussed above, the existing cluster of postings is modified to include the social media posting in the cluster database 136. If at step 1110, the semantic class-based approach also does not result in a cluster correspondence determination, the method proceeds to step 1114, where a new cluster of postings is created to include the social media posting in the cluster database 136. At step 1116, a novelty score is calculated for the new cluster.

In the depicted embodiment of the method 1100, the link-based clustering module 128 and semantic class-based clustering module 132 perform sequential determinations. This may provide a benefit of utilizing the link-based approach, which may involve a relatively lower computational load, to attempt to make a clustering determination first, followed by the semantic class-based approach, which may involve a relatively higher computational load, to attempt to make a clustering determination only on those postings for which the link-based approach did not result in a determination, thus overall conserving computational power. In other embodiments, the link-based clustering module 128 and semantic class-based clustering module 132 can instead be used to perform parallel or differently ordered sequential determinations, or only one or other be used to make a single determination.

Recording modified clusters and new clusters in the cluster database 136 of steps 1114 and 1112 may include storing in the cluster database 136 for each such cluster an identification of the cluster, and, in association with the identification, a representation of each of the postings or a subset of the elements of each of the postings (such as one or more of the name of the account originating the posting, the address of the account originating the posting, the heading of the posting, the time of the posting, etc.) included in the cluster. Recording the modified and new clusters provides improved presentation and consumption of postings in an event based manner by a user system, which may provide improved efficiency of presentation and consumption to a user for a relatively smaller amount of information represented by the clusters in comparison to the total amount of information represented by all of the social media postings of the social media system 24, thereby saving time and effort of the user.

In embodiments, a method of determining whether a social media posting refers to a same event referenced by an existing cluster of postings may include only any subset of, or an alternative ordering of, the features depicted in or discussed above in regard to FIG. 11.

Figure 12:
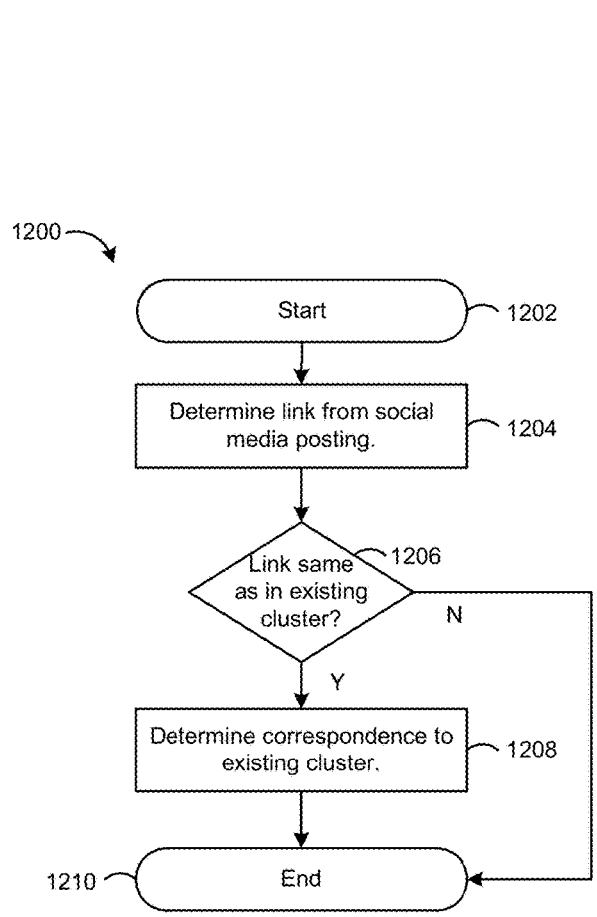
FIG. 12 is a flowchart depicting an embodiment of a method of determining whether a social media posting refers to a same event referenced by an existing cluster of postings using a link-based approach.

FIG. 12 depicts an embodiment of a method 1200 of determining whether a social media posting refers to a same event referenced by an existing cluster of postings using a link-based approach. Embodiments of the method 1200 may be used to perform the cluster correspondence determination of step 1104 of the method 1100. The method 1200 may be performed by or involving components of the event clustering module 64 of FIG. 10, such as the link-based clustering module 128. The method begins at step 1202.

At step 1204, it is determined whether the social media posting includes a link. A link, also called a hyperlink, is an pointer in the social media posting, activatable by a viewer of the social media posting, to another item, such as another social media posting, a web page, etc. A link typically includes an address of the linked item, such as an Internet address, etc. At step 1206, it is determined whether any existing cluster includes postings having the same link determined in step 1204. A very high likelihood may exist that a posting and postings of an existing cluster of postings include the same link refer to the same event. Thus, if at step 1206 it is determined that an existing cluster includes postings having the determined link, the method proceeds to step 1208, where the posting is determined to correspond to the existing cluster having the same link. By contrast, if at step 1206 it is determined that no existing cluster includes postings having the determined link, the method proceeds to step 1210, where the method ends, without a cluster correspondence determination.

In embodiments, a method of whether a social media posting refers to a same event referenced by an existing cluster of postings using a link-based approach may include only any subset of, or an alternative ordering of, the features depicted in or discussed above in regard to FIG. 12.

Figure 13:
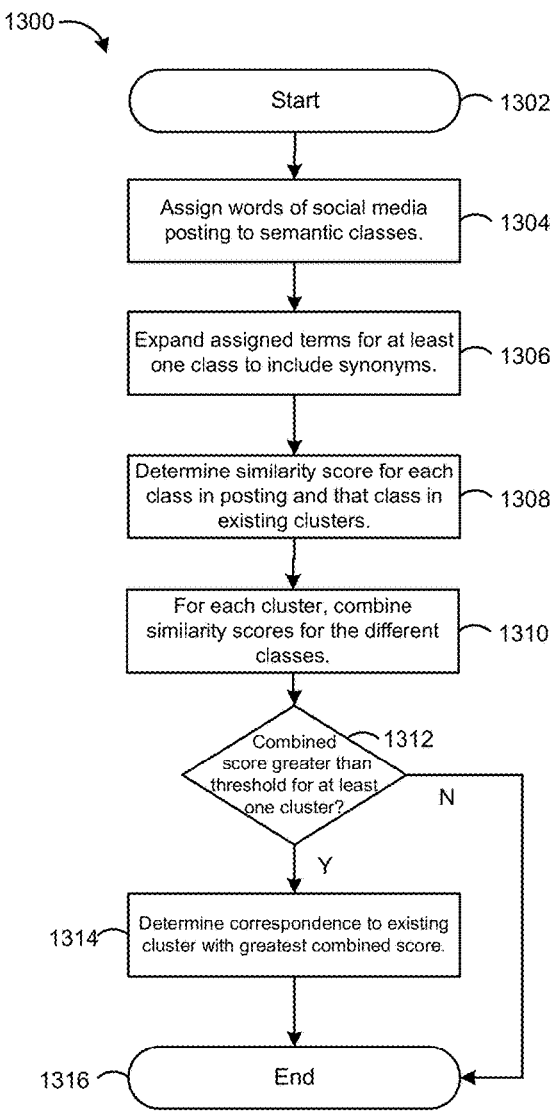
FIG. 13 is a flowchart depicting an embodiment of a method of determining whether a social media posting refers to a same event referenced by an existing cluster of postings using a semantic class-based approach.

FIG. 13 depicts an embodiment of a method 1300 of determining whether a social media posting refers to a same event referenced by an existing cluster of postings using a semantic class-based approach. Embodiments of the method 1300 may be used to perform the cluster correspondence determination of step 1108 of the method 1100. The method 1300 may be performed by or involving components of the event clustering module 64 of FIG. 10, such as the semantic class-based clustering module 132. The method begins at step 1302.

At step 1304, the social media posting is processed to extract terms of the posting corresponding one or more different semantic classes of terms, and assign those terms to the corresponding classes. In general, a social media posting typically contains terms corresponding to aspects that define an event, such as "who," "what," "where" and "when." These terms can be classified into different semantic classes, which will have corresponding different levels of importance for describing an event, and therefore for determining whether a posting should join an existing cluster of postings or should be added to a newly created cluster. In embodiments, the semantic classes used include one or more of (i) proper noun, (ii) mention, (iii) location, (iv) hashtag, (v) verb, and (vi) common noun. For example, the semantic classes can include all of the above classes.

Pronouns may describe the "who" of an event, such as people or organization names. Occasionally, pronouns may also describe the "what" of an event. A mention in a social media posting is a reference to another user of the social media system, usually in the form of an inclusion of the user name or address of the user in the social media system. In many social media postings, "who" is represented by mention. A location may describe the "where" of an event. Location may be represented by proper noun, but may be assigned to the location class. Verbs usually describe the "what" aspect of an event, such as killed, sued, and died. Common nouns, such as hurricane and bomb, are also used to describe the "what" aspect of an event. A hashtag in a social media posting is a word or character sequence following the symbol #. Hashtags usually describe the topic of an event, but it may also reflect the "what" aspect, e.g. #bombing. As discussed above, a link is a pointer in the social media posting to another item, such as another social media posting, a web page, etc. and typically includes an address of the linked item, such as an Internet address, etc.

Rule-based natural language processing can be used to extract and assign terms of the social media posting to corresponding semantic classes. In embodiments, third party processing packages may be used to implement the processing to extract terms corresponding to the semantic classes. For example, the TweetNLP package may be used to identify proper nouns from social media postings. A geo location identifier, such as OpenCalais, may be used to identify locations from social media postings. Verbs also may be extracted using the TweetNLP tool. Additionally, a list of words may be used to filter out very common verbs, such as take, do, etc., that may not be as useful an indicator.

At step 1306, the collections of terms assigned to semantic classes for the posting are expanded to include selected synonyms of the assigned terms. The synonyms can be selected in a variety of ways. In one embodiment, such as discussed further below with respect to FIG. 14, the synonyms for class expansion are selected based on calculating similarities between a word embedding of each term in the class and potential synonyms, and expanding the class using only the synonyms with the highest similarity scores above a certain threshold. In other embodiments, synonyms for class expansion are selected using a dictionary.

At step 1308, for each semantic class having terms assigned from the posting, a similarity score is calculated between the terms in that class for the posting and a set of terms in the same class for each of one or more candidate existing clusters of postings. A similarity score between terms in a semantic class for the posting and in the same class for an existing cluster can be calculated using term frequency.inverse document frequency (tf*idf) and cosine similarity calculations. For example, the tf*idf may be calculated for the terms in the class for the posting, and for terms in the class for the cluster, and a cosine similarity calculated between the calculated tf*idf values for the posting and the calculated tf*idf values for the cluster.

One specific example of the similarity calculation using tf*idf and cosine similarity is as follows. Tf*idf vectors for the terms in the posting and the terms in the cluster may be calculated as follows. For a posting, for a given term t and a semantic class, tf is the appearance frequency of this term in the posting. Usually this tf value is 1, because a posting is short and a term typically just appears once in the posting. For a cluster, the tf value of term t is the number of postings in this cluster that term t appears in. For idf, for a given term t belonging to semantic class, its idf is calculated according to:

$$Idf = \log(N/(d+1));$$

where N is the total number of existing clusters, and d is the total number of existing clusters that term t appears in. The integer value 1 in (d+1) is to avoid a divide-by-zero problem when the term t does not appear in any of the existing clusters, in which case d is 0. Thus, for a given term t and its semantic class, its idf value is the same for the posting and all of the existing clusters. Therefore, in this example, for the tf*idf calculations for the posting and the cluster, the idf is the same, but tf may be different. A term's idf value will be updated when N or d changes. The cosine similarity of the determined tf*idf vectors may be calculated as follows. For a given semantic class, a posting and a cluster, if we use vector A to represent the terms in the posting, and vector B to represent the terms in the cluster, where the values in the vectors are the posting and cluster terms' tf*idf values, the cosine similarity is calculated according the following equation:

$$\text{similarity} = \cos(\theta) = \frac{A \cdot B}{\|A\|_2 \|B\|_2} = \frac{\sum_{i=1}^{n} A_i B_i}{\sqrt{\sum_{i=1}^{n} A_i^2} \sqrt{\sum_{i=1}^{n} B_i^2}},$$

For example, if the posting and the cluster have no terms in common (meaning they have totally different sets of terms), the similarity value will be 0, because the nominator will be 0. In this equation, n is the number of terms in the term space of the given class.

The similarity score between terms in a semantic class for the posting and in the same class for an existing cluster may alternatively or in addition be calculated using other types of calculations, such as a cosine similarity measure between a representation of general word embeddings of the terms of the posting and a representation of general word embeddings of the terms of the cluster, where such representations can be at least one of: a minimum vector calculated from the word embeddings, a maximum vector calculated from the word embeddings, an average vector calculated from the word embeddings, or a concatenation of one or more of the minimum, maximum or average vectors (such as a concatenation of the minimum, maximum and average vectors), similar to as discussed above for the representation of the social media posting.

The terms to represent a cluster for a given semantic class for the similarity calculations may be chosen by one or more of: selecting semantic class terms summarizing the postings in a cluster, using semantic class terms from a posting of the cluster selected as a centroid posting of the cluster, using the a predetermined top percentage of the most frequent terms of postings of the cluster, or using a predetermined top percentage of the most frequent terms of postings of the cluster for the give semantic class.

An index of the terms or a representation of the terms for each of the semantic classes for existing clusters may be maintained, and existing clusters selected for comparison to the posting by consulting the index for candidate clusters, with similarity scores then being calculated for the candidate clusters.

At step 1310, for each existing cluster that the posting is compared to, the individual similarity scores for the plurality of semantic classes are combined into a single combined similarity score for comparing the posting to the existing cluster. The combined similarity score may be a weighted combination of the individual semantic class similarity scores. For example, given a social media posting $T_i$ and a cluster $C_j$, a similarity score $S(T_i, C_j)$ can be defined as:

$$S(T_i, C_j) = a^* V_p + b^* V_m + c^* V_l + d^* V_v + e^* V_n + f^* V_h,$$

where $V_p$, $V_m$, $V_l$, $V_v$, $V_n$ and $V_h$ are the individual similarity scores for the proper noun, mention, location, verb, common noun and hashtag semantic classes, and a, b, c, d, e and f are weights for the respective semantic classes. The weights may be selected to correspondingly emphasize or deemphasize the corresponding individual similarity score's contribution to the combined score, such as, e.g., using a training process.

At step 1312, for each candidate existing cluster, the combined similarity score between the posting and that cluster is compared to a predetermined threshold value.

Comparing the combined scores to the threshold value enables the method to avoid selecting the best of a set of existing clusters that all merely poorly match the posting. The predetermined threshold may be selected, e.g., as a result of a training process. If at step 1312, at least one of the combined similarity scores is greater than the threshold value, the method proceeds to step 1314, where it is determined that the posting corresponds to the existing cluster having the greatest combined similarity score. If, however, at step 1312, none of the combined similarity scores for the candidate clusters is greater than the threshold value, then the method proceeds to step 1316, where the method ends, without determining a correspondence of the posting to an existing cluster.

The semantic class-based approach enables improved clustering of postings relative to other manners of clustering, such as discussed below in comparison to other systems, and thus enables improved presentation of clusters of postings, with a corresponding improved efficiency of consumption of social media by a user, that is not possible otherwise.

In embodiments, a method of determining whether a social media posting refers to a same event referenced by an existing cluster of postings using a semantic class-based approach may include only any subset of, or an alternative ordering of, the features depicted in or discussed above in regard to FIG. 13.

A method of determining whether a social media posting refers to a same event referenced by an existing cluster of postings using a semantic class-based approach may, as an alternative to steps 1310, 1312 and 1314, instead for each candidate cluster compare each individual score for the different semantic classes to a threshold, and then use the semantic classes of candidate clusters above the thresholds as votes for an overall matching cluster, optionally with the semantic class votes again being weighted. As another alternative, instead the individual similarity scores may be fed to a trained classifier to determine the best matching cluster.

FIG. 14 depicts an embodiment of a method 1400 of expanding a set of terms of a posting assigned to a semantic class to include synonyms. Embodiments of the method 1400 may be used to perform the term expansion of step 1306 of the method 1300. The method 1400 may be performed by or involving components of the event clustering module 64 of FIG. 10, such as the semantic class-based clustering module 132. The method begins at step 1402.

At step 1402, for each term assigned to the semantic class for the posting, word embeddings for the term and for each of the potential synonyms of that term are determined. The word embeddings may be general word embeddings. At step 1406, for each term assigned to the semantic class for the posting, similarity scores between the word embedding for the term and for each of the potential synonyms of that term are determined. The similarity scores may be calculated using a cosine similarity measure. At step 1408, it is determined whether, for the terms assigned to the semantic class, at least one of the calculated similarity scores between the terms and the potential synonyms is greater than a predetermined threshold. Comparing the similarity scores to the predetermined threshold enables the method to avoid expanding by terms having only an undesirably abstract similarity of meaning. If at step 1408, none of the similarity scores are greater than the predetermined threshold, then the method proceeds to step 1412, where the method ends, without expanding the term set by the any of the potential synonyms. If at step 1408, at least one of the similarity scores are greater than the predetermined threshold, then the semantic class is expanded by a predetermined number of the potential synonyms having the greatest similarity scores.

In embodiments, a method of expanding a set of terms assigned for a posting to a semantic class to include synonyms may include only any subset of, or an alternative ordering of, the features depicted in or discussed above in regard to FIG. 14.

Returning to step 1116 of the method 1100 depicted in FIG. 11, when no correspondence between the social media posting and an existing cluster is determined, the posting is added to a new cluster, and a novelty score may be calculated. The novelty score may be calculated for the new cluster based on a highest similarity score it has with the existing clusters. In one example, the novelty score is calculated using the following equation:

$$S_{novelty} = (T - S_{max})/T,$$

where T is the threshold value used in step 1312 for a social media posting to join a cluster, and $S_{max}$ is the maximum similarity score between this social media posting and the existing clusters. The novelty score and the identity of the exiting cluster with the highest similarity score may be persisted with the newly formed cluster, which just contains this social media posting for now and is waiting for new postings to join.

Returning to step 216 of the method 200 depicted in FIG. 2, as discussed above modified or new clusters of postings referring to events in the predetermined time period (and/or cluster identification data for the clusters of postings) and/or postings referring to an event in the predetermined time period (and/or temporal identification data for postings as referring to an event in the predetermined time period) may be output for display on the user system 36, such as via the application. In one example, the API 68 of the event clustering module 64 may provide to the communication module 70 of the application the modified or new clusters, such as in response to a request transmitted from the communication module 70 to the API 68 for such, and the application may then present the modified or new clusters of postings to the user in a user interface of the application for display on the user system 36, such as part of a news application, event detection application or other application, etc. In another example, the API 60 of the temporal identification module 56 may provide to the communication module 70 of the application the temporal identifications of postings, such as in response to a request transmitted from the communication module 70 to the API 60 for such, and the application may then incorporate the temporal identification of the postings into a presentation to the user in a user interface of the application for display on the user system 36 such as part of a news application, event detection application or other application, etc.

Alternatively or in addition to the event clustering module 64 and/or temporal identification module 56 providing the modified or new clusters and/or temporal identifications of postings to the application system 32 via the APIs 60, 68 sending such to the communication module 70 in response to a request from the communication module 70 to the APIs 60, 68, the event clustering module 64 and/or temporal identification module 56 may push the modified or new clusters and/or temporal identifications of postings and/or a notification of such to the application system 32 automatically upon modification or creation of new clusters or detection of temporal identifications. For example, the API 68 of the event clustering module 64 may instead or in addition be a communication module to automatically transmit any modified or new cluster to the communication module 70 of the application or to the user system 36 upon modification or creation of the cluster, and/or to transmit a notification, such as an email, text message, etc., of the modification or creation of clusters to the communication module 70 of the application or to the user system 36. In another example, the API 60 of the temporal identification module 56 may instead or in addition be a communication module to automatically transmit temporal identifications of postings to the communication module 70 of the application or to the user system 36 upon determination of the temporal identifications, and/or to transmit a notification, such as an email, text message, etc., of the temporal identifications to the communication module 70 of the application or to the user system 36. Such automatic communication of modified or new clusters or temporal identifications may provide improved timeliness of event, news, opinion etc. delivery to users.

FIG. 15 depicts an embodiment of a view 140 of a cluster of postings provided by the application and/or event detection system 28 to a user system 36. The view includes a cluster heading 144, and a plurality of postings 148 of the cluster spatially grouped for display together on a display of the user system 36. For example, the spatial grouping may include a delineation between the cluster and other areas of a user interface of the application on the user system 36.

In one example, the application may include a feed based on the real-time identification of disasters from social media. Output from the event detection system is used to filter out old events, and make only the novel events appear on the feed.

In another example, the application may include a supply chain risk module, which detects geopolitical risk events from social media, such as natural disasters and man-made disasters, and alert users whose portfolio might be affected by these events. These events may affect the suppliers of a company and are interesting to investors and analysts. The event detection system is used to filter out old events and improve the event detection performance.

An exemplary embodiment of training a neural network to produce the temporal specific word embeddings is now discussed. The exemplary training is a supervised training process, which means the social media postings used for training are labeled data. The social media postings for training are labeled with different temporal information. Novel event detection may be interested in differentiating the past events and non-past events (current and future events), so two labels are used: past and non-past.

In the exemplary embodiment, to train the TSWE model, a very large amount of data is used, such as millions of Tweets. Manually labeling so many Tweets may not be not realistic. To obtain so many labeled Tweets, an approach called distant-supervised data collecting process is used. The data is collected and labeled automatically without manually annotating them, but it contains noisy Tweets because of the lack of manual checking. These automatically collected tweets contain noises so they cannot be directly used as gold training data to build the temporal identification classifiers, but they are effective enough to provide weakly supervised signals for training the TSWE word embedding.

To automatically collect tweets about past events, a list of temporal expression patterns that will confidently identify a tweet that is talking about stories in the past is defined. For example, the temporal expression in year xxxx, if xxxx is smaller than the year of tweet creation time, then we are pretty sure this tweet is talking about something in the past. The following are some examples of the temporal expression patterns that are used to retrieve tweets about past events:

yesterday, last week, last month, last year, last century;

XX days/weeks/months/years/centuries ago;

a complete date expression, e.g. 06/32/2015 and Feb. 3, 2015, and if it is more than X hours (e.g. 12 hours in the experiment) before the tweet creation time;

partial date expression, such as on Jan. 10, in March—based on the tweet creation time, we will identify if the tweet is about a past event;

in XXXX, in the 60's; and before WWII.

This list does not try to exhaust all the possible expressions for past event; it just uses the popular temporal expressions to get enough tweets about old events for training the TSWE model.

The aforementioned patterns were searched using regular expressions against a huge tweet data set. This data set contains Tweets from October 2014 to September 2016, which includes Tweets obtained through Twitter's public streaming API and the Decahose data (10% of Twitter's streaming data) obtained from Twitter. The data set includes only English tweets were included, and totals about 500 million tweets. After searching, 10 million Tweets matching the defined temporal expression patterns resulted, which are very likely to be talking about old events.

To get tweets for non-past events, 10 million tweets from the rest of tweets were randomly sampled to make the two sides have roughly equal amount of tweets. In total, about 20 millions are used to train the TSWE model and generate temporal specific word embeddings.

The following table shows some Tweet examples on new/novel (non-past) events and old events, assuming the current time is Apr. 12, 2016.

| Event Type | Tweet Example |
| --- | --- |
| Non-past event | FULL STORY: Driver indicted after crash into propane tank sparks deadly home explosion<br>Earthquake: 2016-04-12 20:41HKT M5.1 [0.4N96.3E] off west coast of Northern Sumatra<br>6 killed over 10 injured in suicide bomb attack next to police checkpoint in Aden Yemen |
| Old Event | On this day in 2013 an EF2 tornado caused damage in Botkinburg. Find more info here #arwx<br>Decades ago Cold War tensions between the U.S. & communist China were lessened thanks to ping-pong.<br>Bearded vulture found dead in Alpine avalanche identified: it was released in Vercors last month<br>in 1984 & 1989 nearly 35 people died fire crackers accident in Kandashamakadavu Christian Church festival in Kerala<br>Yesterday afternoon firefighters quickly suppressed a wildfire located eight miles east of Hinton in Canadian . . .<br>President Reagan was shot in 1981 |

Before being fed to the model training process, each Tweet was first preprocessed to get a clean version. The preprocess steps were as follows: all urls are removed; all mentions were removed; all ratios and decimal, such as 3/7, are replaced by a special symbol; and all special characters, except the hashtag symbol #, are removed.

Evaluations of embodiments of the systems and methods discussed herein is now discussed. To evaluate the performance of the event clustering module, the evaluation included a large event data set, which has more than 500 events and millions of Tweets.

The performance of the event clustering module has been compared to two algorithms: UMass ("First Story Detection in TDT is Hard", Allen et al, CIKM, 2000a; "Detections, bounds and timelines: UMass and TDT-3," Allen et al., Proceedings of Topic Detection and Tracking, 2000b) and LSH ("Using paraphrase for improving first story detection in news and Twitter," Petrovic et al., CIKM, 2012).

Two quality metrics were used for the evaluation: normalized mutual information (NMI) and B-cubed. NMI is an information-theoretic metric that measures how much information is shared between actual "ground truth" events, each with an associated tweet set, and the clustering assignment. Specifically, for a set of clusters C=(C1, C2, . . . , Cj) and events E=(E1, E2, . . . , Ek), where each Cj and Ek is a set of tweets, and n is the total number of tweets, NMI is defined as:

$$NMI(C, E) = \frac{I(C.E)}{(H(C) + H(E))/2}, \text{ where}$$

$$I(C, E) = \sum_j \sum_k \frac{|e_k \cap c_j|}{n} \log \frac{n * |e_k \cap c_j|}{|e_k| * |c_j|},$$

$$H(C) = -\sum_j \frac{|c_j|}{n} \log \frac{|c_j|}{n}, \text{ and}$$

$$H(C) = -\sum_k \frac{|e_k|}{n} \log \frac{|e_k|}{n}.$$

B-cubed estimates the precision and recall associated with each tweet in the dataset individually, and then uses the average precision Pb and average recall Rb values for the dataset to compute B-Cubed:

$$B\text{-Cubed} = \frac{2 * P_b * R_b}{P_b + R_b}$$

For each Tweet, precision was defined as the proportion of items in the Tweet's cluster corresponding to the same event, and recall as the proportion of Tweets that correspond to the same event, which are also in the Tweet's cluster.

An existing event corpus was used to conduct the evaluation. It contains Tweets from a period of 4 weeks, from Dec. 10, 2012, and includes over 120 million tweets collected. Events are generated and manually checked using crowd sourcing, which resulted in 506 events containing over 150K tweets. Further, 1.3 million tweets from the 120 million tweet ids that do not belong to any of these events were extracted as noise data.

To compare the present methods to LSH and UMass, the data was split into 5 folds, with the training folds being used to learn the clustering threshold, algorithm setting and feature weights. The results are shown in the below table:

| Method | NMI | B-Cubed |
| --- | --- | --- |
| LSH | 0.522 | 0.18 |
| UMass | 0.714 | 0.241 |
| Present approach (Semantic class based) | 0.779 | 0.404 |

This table shows that the present methods outperformed the other two algorithms. The difference between any two is statistically significant at p=0.01 level using paired-t test.

To evaluate the effectiveness of using general word embeddings for expanding the semantic terms, the same data set used for comparing the clustering to LSH and UMass is used, and the quality metrics are also the same, NMI and B-Cubed. One version uses the general word embeddings to find the highly similar terms for Tweet terms, and another version has no word embedding or term expansion involved.

The Tweets used for learning word embeddings were from October 2014 to September 2016. Only English Tweets were used, and about 200 million Tweets are used for building the general word embedding model. Each Tweet was preprocessed to get a clean version, and then the clean version was processed by the word embedding model building process. Totally, 2.9 billion words were processed.

The results of the evaluation shoed the performance difference between using term expansion based on word embedding and not using term expansion based on word embedding using the NMI and B-Cubed metrics as shown in the below table:

| Performance (ranging from 0 to 1) | NMI | B-Cubed |
| --- | --- | --- |
| With term expansion using word embedding | 0.78 | 0.40 |
| Without term expansion using word embedding | 0.74 | 0.37 |

This shows that using term expansion based on word embedding does improve the event cluster quality, and the difference is statistically significant using paired-t test at the level of p=0.05.

The event data set used for evaluation was from year data from 2014 to 2016. It is possible that some terms from the 2012 data set are not used much from 2014 to 2016, and so they might not be included in the embedding model. Therefore, one can reasonably expect that if the embedding model had been learned from tweets in the same time period as the event data set, the performance might be even better.

To evaluate the temporal identification, precision is used. In a novel event detection system, precision may be more important than recall. Here precision means, for the old events identified by this module, how much percent of them are correct. And recall means, for a given set of old events that are manually labeled, how much percent of them are detected by this module.

To calculate precision, 25,000 Tweets were passed them through the temporal identification module. For the events identified as old ones, two annotators manually evaluated them, and the precision was calculated based on their labeling.

The below table shows the evaluation result of the temporal identification module. The result shows a very high precision. Many Tweets don't have any temporal expression that can be used to identify the time of the event. But in a lot of cases, just based on the entities in the Tweet text, one can tell that whether it is about an old event or new event. For example, the tweet "President Reagan was shot" obviously is talking about an event that happened thirty years ago, but there is no temporal expression in this tweet for the rule-based module to work on. In this case, the TSWE module will help, because the TSWE embeddings for "Reagon" might have enough temporal information embedded to provide evidence for identifying this tweet as a past event.

| Metric | Number of Event Clusters | Number of Old Events Identified by the Module | Number of Old Events by Annotators | Performance |
|---|---|---|---|---|
| Precision | 25,000 | 1,252 | 1,207 | 96.3% |

Embodiments of the social media system 24, event detection system 28, application system 32, and user system 36, and/or any individual one, subset, or all of the components thereof, such as the social media intake module 48, temporal identification module 56, event clustering module 64, social media retrieval module 72, social media database 76, rule-based temporal identification module 116, TSWE-based temporal identification module 120, temporal identification database 124, link-based clustering module 128, semantic class-based clustering module 132, and cluster database 136, etc., may be implemented as hardware, software, or a mixture of hardware and software. For example, each of the social media system 24, event detection system 28, application system 32, and user system 36, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In embodiments, each of the social media system 24, event detection system 28, application system 32, and user system 36, and/or any individual one, subset, or all of the components thereof, may be implemented using one or more computer systems, such as, e.g., a desktop computer, laptop computer, mobile computing device, network device, server, Internet server, cloud server, etc.

FIG. 16 depicts an embodiment of a computer system 152 that may be used to implement the event detection system 28 and/or any individual one, subset, or all of the components thereof. The computer system 152 includes a processor 156, a non-transitory machine-readable storage medium 164, a communication module 160, and optionally other components 168. The processor 156 executes program instructions stored in the non-transitory machine-readable storage medium 164 to perform the functionality of the component it is implementing as discussed herein. The communication module 160 be controlled by the processor to communicate with other devices, such as the social media system 24, application system 32 and/or user system 36, to perform the functionality of the component it is implementing as discussed herein. The optional other components 168 may include any further components required by the computer system 152 to perform this functionality.

Additional embodiments of the social media system 24, event detection system 28, application system 32, and user system 36, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of detecting events in and clustering social media postings for display on a user system, the method comprising:

retrieving, via an application programming interface (API) of a social media system over at least one first communication network, at least one posting of the social media system;

determining whether the at least one posting has content referring to a predetermined time period;

upon determining that the at least one posting has content referring to the predetermined time period, determining whether the at least one posting corresponds to an existing cluster of postings related to an event, wherein the determining whether the at least one posting corresponds to the existing cluster of postings related to the event utilizes a semantic-class-based approach including:

assigning words of the at least one posting to a plurality of different semantic classes;

for each semantic class, determining a similarity score between the words assigned to that semantic class for the at least one posting and words assigned to a corresponding semantic class for at least one existing clusters of postings;

combining the similarity scores for the plurality of semantic classes to generate a combined similarity score; and determining whether the combined similarity score exceeds a predetermined threshold;

upon determining that the at least one posting corresponds to the existing cluster of postings relating to the event, storing, in at least one database on a non-transitory machine-readable storage medium, the existing cluster of postings modified to include the at least one posting; and providing, via at least one second communication network, a representation of the modified existing cluster of postings for display on a user system.

2. The method of claim 1, wherein:

the determining whether the at least one posting has content referring to the predetermined time period is performed as a function of at least one temporal-specific word embedding for the at least one posting, the temporal-specific word embedding including at least one numeric vector representing a temporal meaning of a word of the at least one posting in a vector space, wherein the determining whether the at least one posting has content relating to the predetermined time period includes:

determining temporal-specific word embeddings for words of the at least one social media posting;

generating a representation of the at least one social media posting based on the temporal-specific word embeddings; and performing a classification of the at least one posting as including content related to the predetermined time period or not based on the generated representation.

3. The method of claim 1, further comprising, upon determining that the at least one posting does not correspond to the existing cluster of postings, storing, in the at least one database, a new cluster of postings including the at least one posting.

4. The method of claim 3, further comprising calculating a novelty score for the new cluster of postings.

5. The method of claim 1, further comprising, upon determining that the at least one posting has content referring to the predetermined time period, storing a temporal identification of the at least one posting in the at least one database.

6. The method of claim 5, further comprising providing the temporal identification of the at least one posting as an output from an API in response to a request from an application to the API.

7. The method of claim 5, further comprising automatically providing the temporal identification of the at least one posting to an application in response to the determining that the at least one posting has content referring to the predetermined time period.

8. The method of claim 1, wherein the providing the representation of the modified existing cluster of postings includes delineating the existing cluster from other postings or clusters in a user interface of an application on the user system.

9. The method of claim 1, wherein the providing the representation of the modified existing cluster of postings includes providing the modified cluster of postings as an output of an API in response to a request from an application to the API.

10. The method of claim 1, wherein the providing the representation of the modified existing cluster of postings includes automatically providing the representation of the modified existing cluster to an application in response to the determining that the at least one posting corresponds to the existing cluster of postings relating to the event.

11. The method of claim 1, wherein the determining whether the at least one posting has content relating to the predetermined time period includes:
    processing text of the at least one posting using a rule set to attempt to determine whether the at least one posting has content relating to the predetermined time period; and
    upon the processing the at least one posting using the rule set not being able to determine whether the at least one posting has content relating to the predetermined time period, attempting to determine whether the at least one posting has content relating to the predetermined time period using temporal-specific word embeddings determined for the at least one posting.

12. The method of claim 1, wherein:
    the determining whether the at least one posting has content referring to the predetermined time period utilizes a rules-based approach including:
    determining a temporal expression in the at least one posting;
    determining a time difference between the temporal expression and a creation time of the at least one posting; and
    comparing the time difference to a predetermined threshold.

13. The method of claim 12, wherein the rules-based approach further includes:
    upon determining that the time difference is greater than the predetermined threshold, classifying the at least one posting as not including content related to the predetermined time period; and
    upon determining that the time difference is less than the predetermined threshold, classifying the at least one posting as corresponding to the predetermined time period.

14. The method of claim 1, wherein the determining whether the at least one posting has content relating to the predetermined time period is performed as a function of temporal-specific word embeddings for the at least one posting.

15. The method of claim 1, wherein the determining whether the at least one posting has content relating to the predetermined time period includes:
    determining temporal-specific word embeddings for words of the at least one social media posting;
    generating a representation of the at least one social media posting based on the temporal-specific word embeddings; and
    performing a classification of the at least one posting as including content related to the predetermined time period or not based on the generated representation.

16. The method of claim 1, wherein the determining whether the at least one posting corresponds to the existing cluster of postings related to the event utilizes a link-based approach including:
    determining a link in the at least one social media posting;
    determining whether the link is included in the existing cluster of postings; and
    upon determining that the link is included in the existing cluster of postings, classifying the at least one posting as corresponding to the existing cluster of postings.

17. The method of claim 1, wherein the semantic class-based approach further includes:
    for at least one of the semantic classes, expanding the assigned words by adding synonyms of the assigned words.

18. The method of claim 17, further comprising determining the synonyms by:
    determining word embeddings for the assigned terms and potential synonyms; and
    generating similarity scores between the word embeddings for the assigned terms and potential synonyms.

19. The method of claim 18, wherein the determining the synonyms further includes:
    determining whether the similarity scores for the potential synonyms exceed a predetermined threshold; and
    upon determining that at least one of the similarity scores exceeds the predetermined threshold, expanding the assigned terms to include specific synonyms having the similarity scores exceeding the predetermined threshold.

20. The method of claim 1, wherein the retrieving includes communicating a request over the at least one first communication network to the API of the social media system, and receiving a response over the at least one first communication network from the API including the at least one social media posting.

21. The method of claim 1, wherein the outputting includes generating and transmitting over the at least one first communication network a signal representing the modified existing cluster of postings.

22. A system for detecting events in and clustering social media postings for display on a user system, the system comprising:
    at least one processor; and
    a non-transitory machine readable medium having program instructions, which when executed by the at least one processor performs a method, the method including:
    retrieving, via an application programming interface (API) of a social media system over at least one first communication network, at least one posting of the social media system;
    determining whether the at least one posting has content referring to a predetermined time period;
    upon determining that the at least one posting has content referring to the predetermined time period, determining whether the at least one posting corresponds to an existing cluster of postings related to an event, wherein the determining whether the at least one posting corresponds to the existing cluster of postings related to the event utilizes a semantic-class-based approach including:

assigning words of the at least one posting to a plurality of different semantic classes;

for each semantic class, determining a similarity score between the words assigned to that semantic class for the at least one posting and words assigned to a corresponding semantic class for at least one existing clusters of postings;

combining the similarity scores for the plurality of semantic classes to generate a combined similarity score; and determining whether the combined similarity score exceeds a predetermined threshold;

upon determining that the at least one posting corresponds to the existing cluster of postings relating to the event, storing, in at least one database on the non-transitory machine-readable storage medium, the existing cluster of postings modified to include the at least one posting; and providing, via at least one second communication network, a representation of the modified existing cluster of postings for display on a user system.

23. A non-transitory machine-readable storage medium having program instructions, which when executed by at least one processor perform a method of detecting events in and clustering social media postings for display on a user system, the method comprising:

retrieving, via an application programming interface (API) of a social media system over at least one first communication network, at least one posting of the social media system;

determining whether the at least one posting has content referring to a predetermined time period;

upon determining that the at least one posting has content referring to the predetermined time period, determining whether the at least one posting corresponds to an existing cluster of postings related to an event, wherein the determining whether the at least one posting corresponds to the existing cluster of postings related to the event utilizes a semantic-class-based approach including:

assigning words of the at least one posting to a plurality of different semantic classes:

for each semantic class, determining a similarity score between the words assigned to that semantic class for the at least one posting and words assigned to a corresponding semantic class for at least one existing clusters of postings;

combining the similarity scores for the plurality of semantic classes to generate a combined similarity score; and determining whether the combined similarity score exceeds a predetermined threshold;

upon determining that the at least one posting corresponds to the existing cluster of postings relating to the event, storing, in at least one database on the non-transitory machine- readable storage medium, the existing cluster of postings modified to include the at least one posting; and providing, via at least one second communication network, a representation of the modified existing cluster of postings for display on a user system.

\* \* \* \* \*